United States Patent
Arai

(10) Patent No.: US 12,269,690 B2
(45) Date of Patent: Apr. 8, 2025

(54) BOLT ESCAPEMENT DEVICE

(71) Applicant: DENGENSHA TOA CO., LTD., Kanagawa (JP)

(72) Inventor: Yoshihiro Arai, Kanagawa (JP)

(73) Assignee: DENGENSHA TOA CO., LTD., Kanagawa (JP)

( * ) Notice: Subject to any disclaimer, the term of this patent is extended or adjusted under 35 U.S.C. 154(b) by 183 days.

(21) Appl. No.: 18/254,090

(22) PCT Filed: Oct. 21, 2021

(86) PCT No.: PCT/JP2021/039015
§ 371 (c)(1),
(2) Date: May 23, 2023

(87) PCT Pub. No.: WO2022/113588
PCT Pub. Date: Jun. 2, 2022

(65) Prior Publication Data
US 2023/0416013 A1    Dec. 28, 2023

(30) Foreign Application Priority Data
Nov. 24, 2020 (JP) .................................. 2020-194515

(51) Int. Cl.
*B65G 47/06* (2006.01)
*B65G 11/20* (2006.01)

(52) U.S. Cl.
CPC .............. *B65G 47/06* (2013.01); *B65G 11/20* (2013.01); *B65G 2201/02* (2013.01)

(58) Field of Classification Search
None
See application file for complete search history.

(56) References Cited

U.S. PATENT DOCUMENTS 3,276,625 A * 10/1966 Ziskal ................... B23P 19/002
221/290
3,970,218 A * 7/1976 Lee ....................... B65G 47/256
221/13

(Continued)

FOREIGN PATENT DOCUMENTS

| JP | S5150780 U | 4/1976 |
| JP | H09110159 | 4/1997 |

(Continued)

OTHER PUBLICATIONS

International Search Report by ISA/JP mailed on Dec. 8, 2021 in PCT application PCT/JP2021/039015 (Japanese 5 pgs; English Translation 2 pgs.).
Written Opinion by ISA/JP mailed on Dec. 8, 2021, in PCT application PCT/JP2021/039015 (Japanese 4 pgs.).

(Continued)

*Primary Examiner* — Kavel Singh
(74) *Attorney, Agent, or Firm* — Capitol City TechLaw, PLLC; Samuel P. Burkholder

(57) ABSTRACT

A bolt escapement device includes holding rails, a blade disposed downstream of the holding rails, and a chute disposed downstream of the blade. The blade includes: a blade body configured to reciprocate in a direction intersecting the holding rails to pass through a first position and a second position; a bolt passageway extending in the blade body in a direction acute to a moving direction of the blade body; and a closure portion provided on a side surface of the blade body. At least one of the holding rails and the chute is provided with bolt guides. When the blade body moves from the first position to the second position, a corner portion of the bolt passageway that is closer to the holding rails is inserted between a bolt having entered the bolt passageway and a subsequent bolt and the rail gap is closed by the closure portion.

5 Claims, 15 Drawing Sheets

(56) References Cited

U.S. PATENT DOCUMENTS

| | | | | |
|---|---|---|---|---|
| 4,209,959 | A | * | 7/1980 | Bachman ................ B65B 35/56 53/436 |
| 5,480,087 | A | | 1/1996 | Young et al. |
| 5,628,101 | A | * | 5/1997 | Liao ..................... B23P 19/004 29/33 K |
| 5,775,478 | A | * | 7/1998 | Shinjo .................. B65G 47/256 193/25 FT |
| 5,853,108 | A | * | 12/1998 | Ando ..................... H05K 13/02 406/137 |
| 5,933,944 | A | * | 8/1999 | Schmidt ................. A41H 37/00 29/818 |
| 6,102,193 | A | * | 8/2000 | Rivers, Jr. ............. B23P 19/004 414/749.2 |
| 6,434,911 | B1 | * | 8/2002 | Yamamoto ........... B65G 47/256 53/53 |
| 9,365,359 | B2 | * | 6/2016 | Sirkett .................... B65G 47/19 |
| 10,336,554 | B1 | * | 7/2019 | Kolodziej ................ B21J 15/32 |
| 11,548,736 | B2 | * | 1/2023 | Greenwald .......... B65G 37/005 |

FOREIGN PATENT DOCUMENTS

| | | |
|---|---|---|
| JP | 2004066328 A | 3/2004 |
| JP | 2009154971 A | 7/2009 |
| JP | 2011031377 A | 2/2011 |

OTHER PUBLICATIONS

Notice of Written Submission of Publications in JP Patent Application 2020-194515 submitted on Sep. 19, 2023 (1 page in Japanese).

Notice of Written Submission of Publications in JP Patent Application 2020-194515 submitted on Sep. 19, 2023 , English translation (1 page in English).

Written Submission of Publications in JP Patent Application 2020-194515 submitted on Sep. 19, 2023 (53 pages in Japanese).

Written Submission of Publications in JP Patent Application 2020-194515 submitted on Sep. 19, 2023, partial English translation (9 pages in English).

\* cited by examiner

BOLT ESCAPEMENT DEVICE

TECHNICAL FIELD

The present invention relates to a bolt escapement device that can release one bolt at a time from bolts flowing continuously in a predetermined posture through rails and supply it to the subsequent process, such as a welding process.

BACKGROUND ART

When bolts are used in a welding process for instance, it is necessary that each of a plurality of bolts be aligned in a predetermined posture and flowed continuously and that these continuously flowing bolts be released one-by-one and fed to the welding process.

To supply bolts, threaded portions of the bolts hang down with head portions of the bolts placed on parallel rails that are inclined longitudinally from upper to lower sides. The bolts hanging down in the rails are flowed continuously by natural fall and pushed laterally to be released one-by-one at a lower end side of the rails by a piston rod moving orthogonally (transversely) to the longitudinal rails. These released bolts are introduced into an air tube hole and supplied to the subsequent welding process. This type of conventional device is described in Patent Literatures 1 and 2.

CITATION LIST

Patent Literature

Patent Literature 1: JPH09-110159A
Patent Literature 2: JP2004-66328A

SUMMARY OF INVENTION

Technical Problem

Suppose that a distal end of the piston rod pushes out a root portion or a distal portion of a long and narrow threaded portion of a bolt when the piston rod is used to release bolts hanging down vertically and flowing between the rails one-by-one. In this case, a bolt may disadvantageously tilt obliquely from the vertically handing posture and the head portion of the bolt gets caught and clogged in the air tube hole (hole) for conveying bolts to the subsequent process.

Further, a lateral force of the piston rod is transmitted to bolts waiting longitudinally in the rails during the releasing operation using the piston rod, so that waiting bolts are lifted upward by receiving a force oppositely applied in the original direction, in which the waiting bolts are to be moved. If this phenomenon happens, problems such as wear of peripheral parts and risk of bolt jamming may disadvantageously occur.

In view of the above, an object of the present invention is to provide a bolt escapement device, by which bolts having been flowed continuously in the rails can be released one-by-one so as not to clog in the hole for conveying bolts to the subsequent process, and by which one bolt can be released at a time while preventing bolts waiting in the rails before release from being lifted in the opposite direction of the moving direction of the bolts.

Solution to Problem

A bolt escapement device of the present invention to solve the above problems includes: holding rails configured to hold a plurality of bolts hanging down in a rail gap while conveying them downstream; a blade disposed downstream of the holding rails and configured to release the bolts one-by-one from the holding rails; and a chute disposed downstream of the blade and having a through hole, through which a bolt having been released is dropped down. The blade includes: a blade body configured to reciprocate in a direction intersecting the holding rails to pass through a first position and a second position; a bolt passageway extending in the blade body in a direction acute to a moving direction of the blade body and allowing a bolt having been released to pass therethrough; and a closure portion provided on a side surface of the blade body that is closer to the holding rails and configured to close the rail gap. An upstream side of the bolt passageway communicates with the rail gap when the blade body is in the first position, and a downstream side of the bolt passageway communicates with the through hole when the blade body is in the second position. At least one of the holding rails and the chute is provided with bolt guides, the bolt guides intersecting the bolt passageway and configured to guide the bolts from an outlet of the rail gap to the through hole. When the blade body moves from the first position to the second position, a corner portion of the bolt passageway that is closer to the holding rails is inserted between a bolt having entered the bolt passageway and a subsequent bolt and the rail gap is closed by the closure portion.

Advantageous Effects of Invention

According to a bolt escapement device of the present invention, bolts having been flowed continuously in the rails can be released one-by-one so as not to clog in the hole for conveying bolts to the subsequent process, and further one bolt can be released at a time while preventing bolts waiting in the rails before release from being lifted in the opposite direction of the moving direction of the bolts.

DESCRIPTION OF EMBODIMENTS

With reference to the drawings, one embodiment of the present invention is described below.

Configuration of the Embodiment

Figure 1:
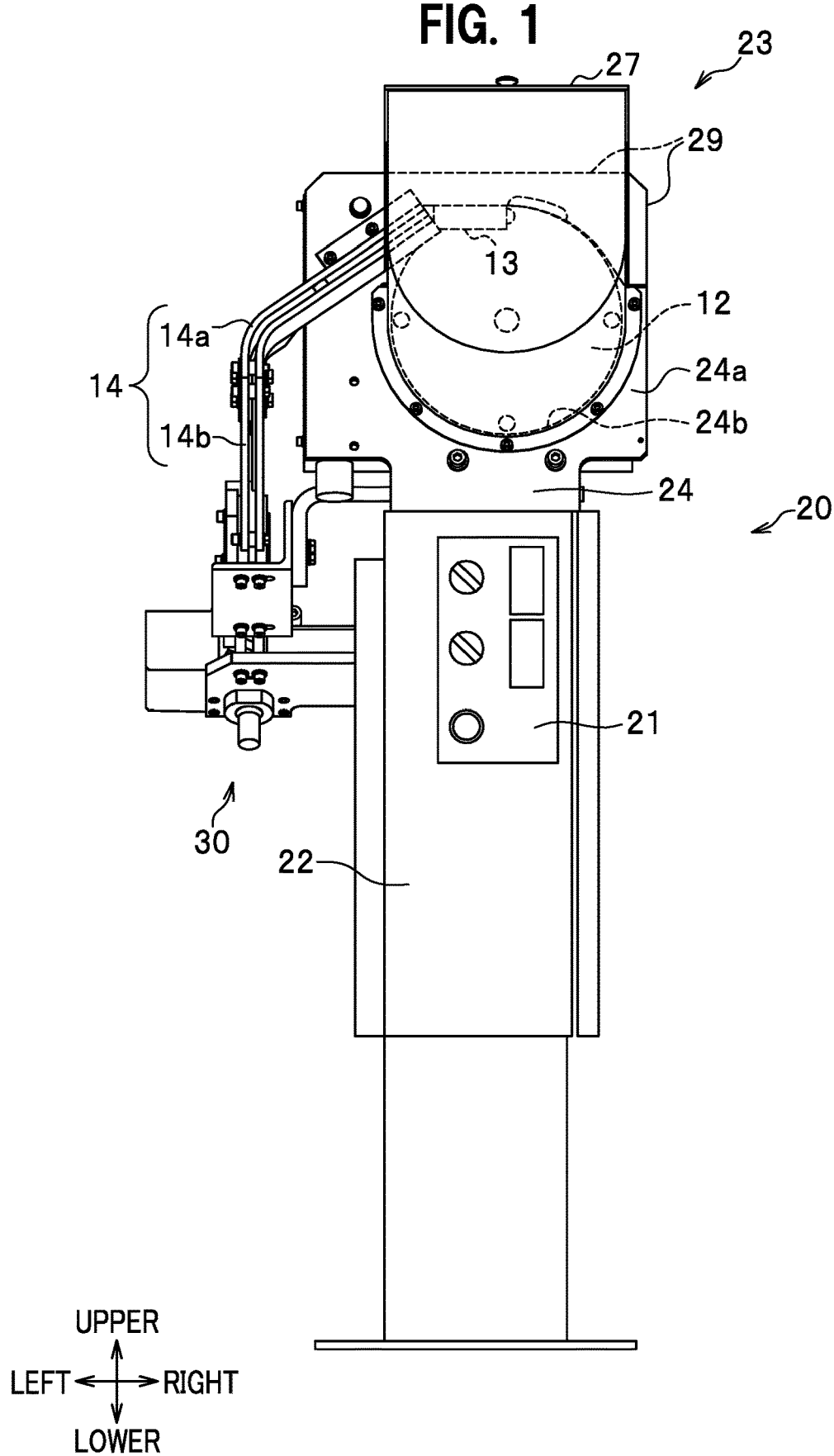
FIG. 1 is a front view illustrating the configuration of a bolt feeding apparatus equipped with a bolt escapement device according to one embodiment of the present invention.
Figure 2:
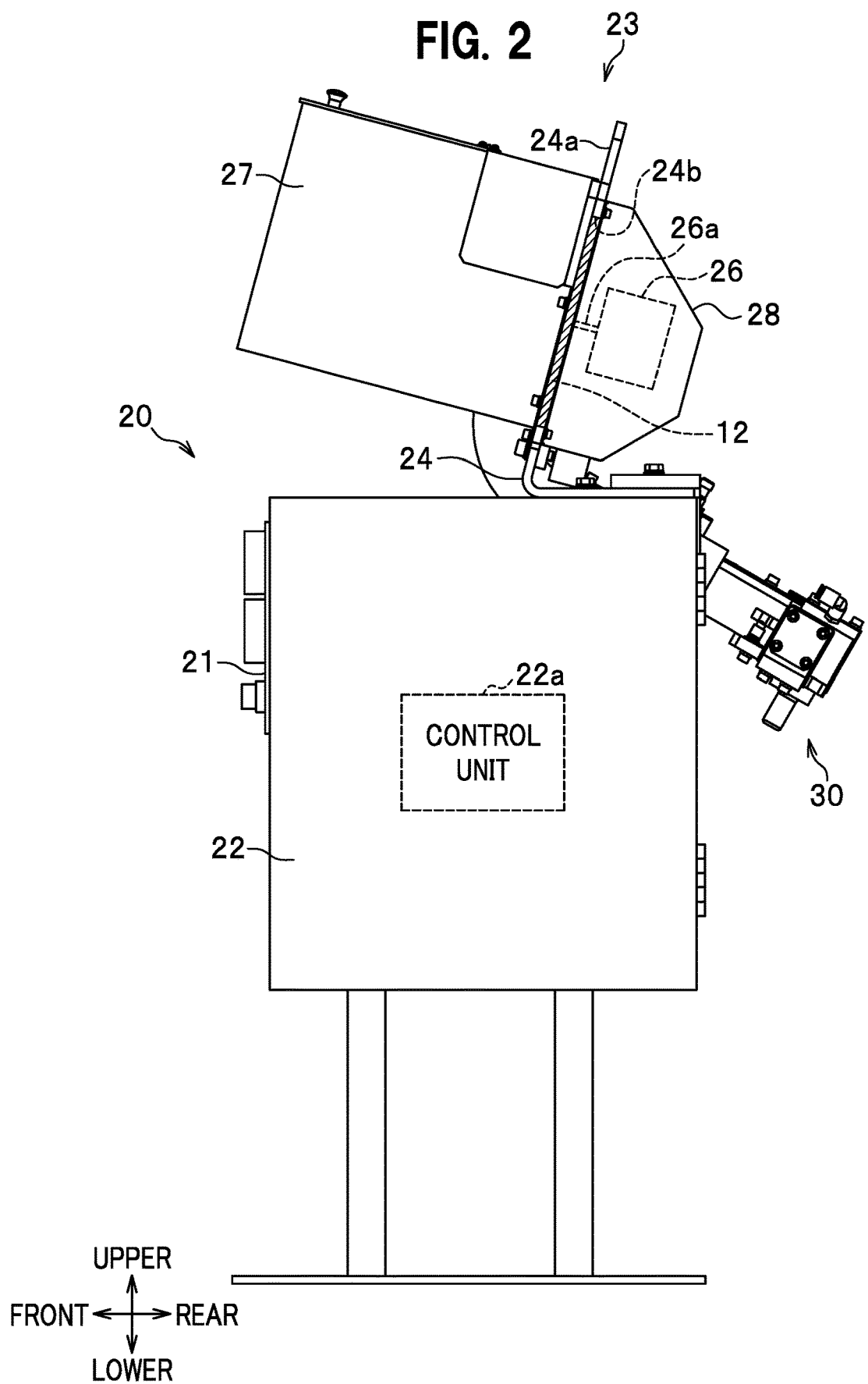
FIG. 2 is a partial cross-sectional side view illustrating the configuration of the bolt feeding apparatus.

FIG. 1 is a front view illustrating the configuration of a bolt feeding apparatus equipped with a bolt escapement device according to one embodiment of the present invention. FIG. 2 is a side view illustrating the configuration of the bolt feeding apparatus shown in FIG. 1. In each of the drawings, "front and rear" directions indicated by the arrows correspond to front and rear directions of the bolt feeding unit, "right and left" directions indicated by the arrows correspond to right and left directions of the bolt feeding unit, and "upper and lower" directions indicated by the arrows correspond to vertically upper and lower directions.

A bolt feeding apparatus 20 shown in FIG. 1 includes a control panel 22 having an operation panel 21 and arranged vertically on the floor, a bolt feeding unit 23 disposed above the control panel 22, and a bolt escapement device (also referred to as a separator) 30 disposed at a lateral and back sides (see FIG. 3) of the control panel 22.

The bolt escapement device 30 is a characteristic element of this embodiment and is connected through chute rails 14 to the bolt feeding unit 23 disposed above the bolt escapement device 30. In the following description, description will be given in the order of the bolt feeding unit 23 and the bolt escapement device 30; the bolt feeding unit 23 is configured to feed bolts to the chute rails 14 in the same posture, and the bolt escapement device 30 is configured to release (separate and feed) bolts that flow continuously in the chute rails 14 by natural fall one-by-one while holding a plurality of bolts in the holding rails 31 and then feed them to the subsequent welding process (subsequent process).

As seen in FIG. 2, the bolt feeding unit 23 includes a mount 24 having an L-shaped side profile and having an inclined plate 24a with a circular opening 24b (see FIG. 1) bored therethrough, a circular disk-shaped rotating plate 12 rotatably assembled in the circular opening 24b, and a motor 26 having a rotary shaft 26a that is fixed at the center of the rotating plate 12. The motor 26 is covered by a motor cover 28.

The bolt feeding unit 23 includes a hopper 27 provided to extend obliquely upward from the inclined plate 24a toward the operation panel 21, and chute rails 14 (FIG. 1) extending laterally downward and protruding from the mount 24 and connected to the bolt escapement device 30.

Figure 4:
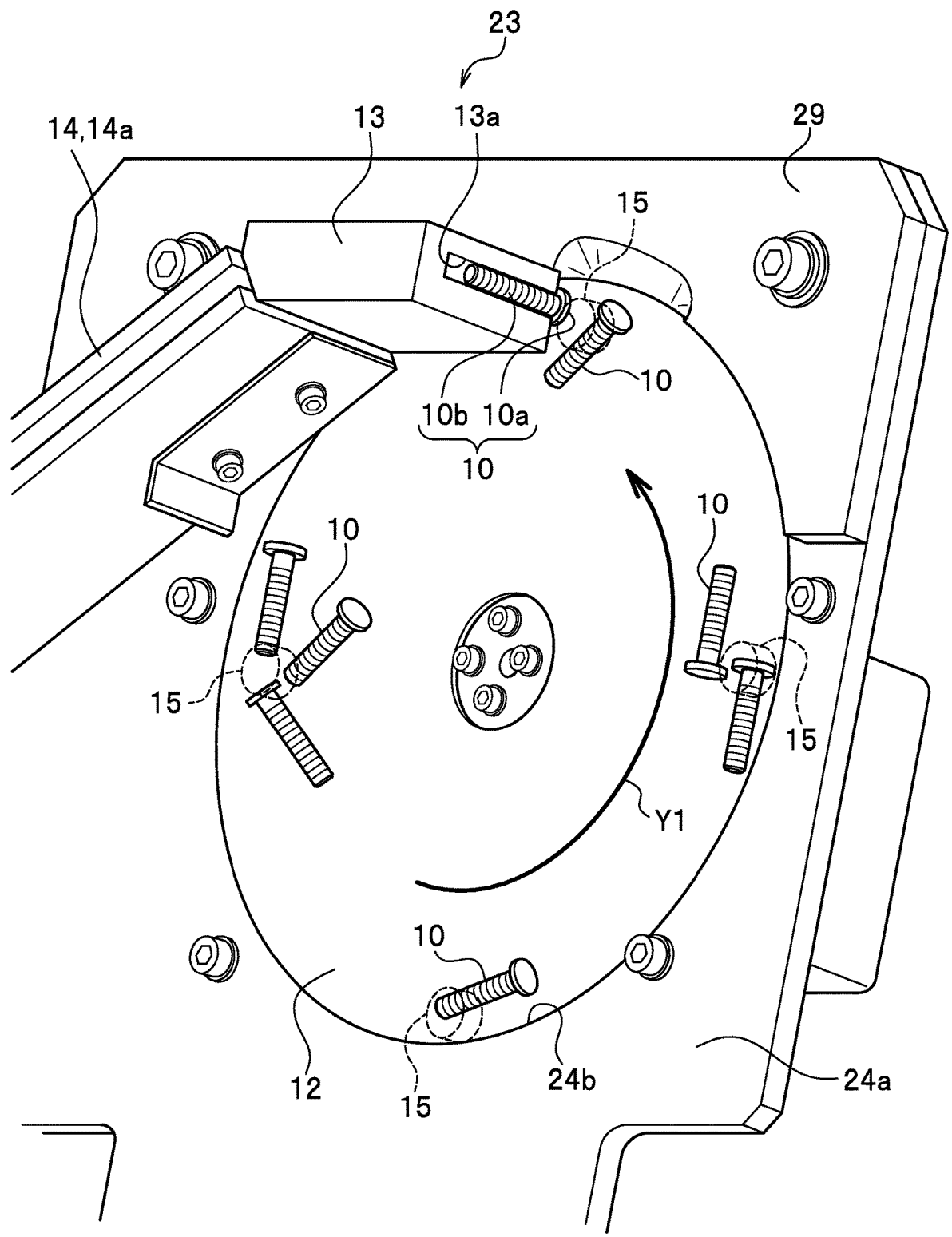
FIG. 4 is a perspective view of the bolt feeding apparatus illustrating the configuration of an inclined surface of a guide plate and its surrounding structure.

Further, as seen in FIG. 4, the bolt feeding unit 23 includes a rectangular prism-shaped sorting block 13 connected continuously to the uppermost portions of the chute rails 14, and a guide plate 29 fixed to the upper side of the inclined plate 24a.

Figure 3:
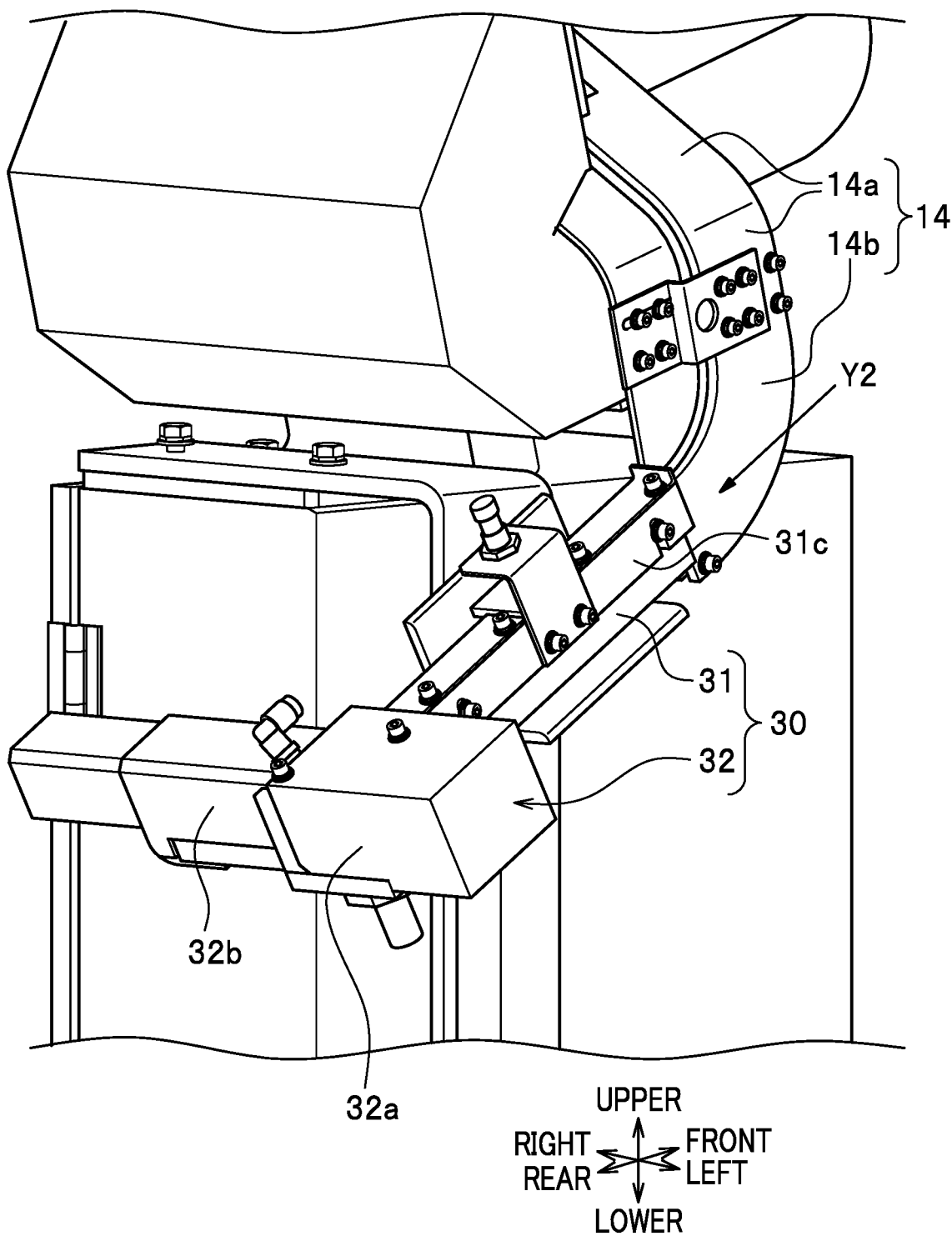
FIG. 3 is a perspective view of the bolt escapement device disposed at a lateral and back sides of the bolt feeding apparatus.

The chute rails 14 consist of rails 14a closer to the sorting block 13, and rails 14b connected continuously to the lower ends of the rails 14a (see FIG. 3). The rails 14a extend obliquely downward from the outlet side of the sorting block 13 along the surface of the mount 24 (FIG. 1) and protrude out from the mount 24. The protruding portions of the rails 14a are curved toward the mount 24 to form distal end portions parallel to the side surface of the mount 24. As seen in FIG. 3, the distal end portions are connected to the rails 14b that are curved and extend obliquely from the front side toward the rear lower side of the bolt feeding unit 23. The rails 14b extend parallel to the side surface of the mount 24 (see FIG. 1). The rear ends of the rails 14b are connected to the holding rails 31 of the bolt escapement device 30.

As seen in FIG. 4, the sorting block 13 has a gap (passageway) 13a through which a bolt 10 passes. The gap 13a is formed to extend through the sorting block 13 from the front side (front face) to the rear side thereof in a bolt conveying direction. Further, the gap 13a has dimensions corresponding to a threaded portion 10b of a bolt 10 so that one bolt 10 or continuously fed bolts 10 can pass through the gap 13a one-by-one. The rotating plate 12 is disposed under the gap 13a and under the sorting block 13 through a gap spacing.

The gap spacing is slightly larger in dimension than the thickness of the head portion 10a of the bolt 10. In other words, when the threaded portion 10b of one bolt 10 enters the gap 13a in the upstanding posture, which posture allows the threaded portion 10b to pass through the gap 13a, the head portion 10a can enter and pass through the gap spacing.

As shown by the arrow Y1, the rotating plate 12 rotates in a direction toward the inlet of the gap 13a, and magnets 15 are arranged at 90-degree intervals along the periphery on the reverse side of the rotating plate 12. The magnets 15 serve to attract a number of bolts 10 stored 20 in the hopper 27 on the surface of the rotating plate 12 and convey them to the gap 13a, and further to convey bolts 10 in the gap 13a to parallel rails 14a.

When the rotating plate 12 rotates in a direction indicated by the arrow Y1, bolts 10 attracted by the magnets 15 on the surface of the rotating plate 12 are conveyed to the gap 13a of the sorting block 13. These bolts 10 pass through the gap 13a in an inverted posture (inverted position) with the head portions 10a positioned downward and the threaded portions 10b upstanding, and the bolts 10 are moved toward the rails 14a. Thereafter, as seen in FIG. 1, the bolts 10 in the inverted posture flow through the rails 14a by natural fall, and inverted into the upright posture (upright position) by an inversion mechanism (not shown) when they flow through the parallel rails 14b.

Figure 5:
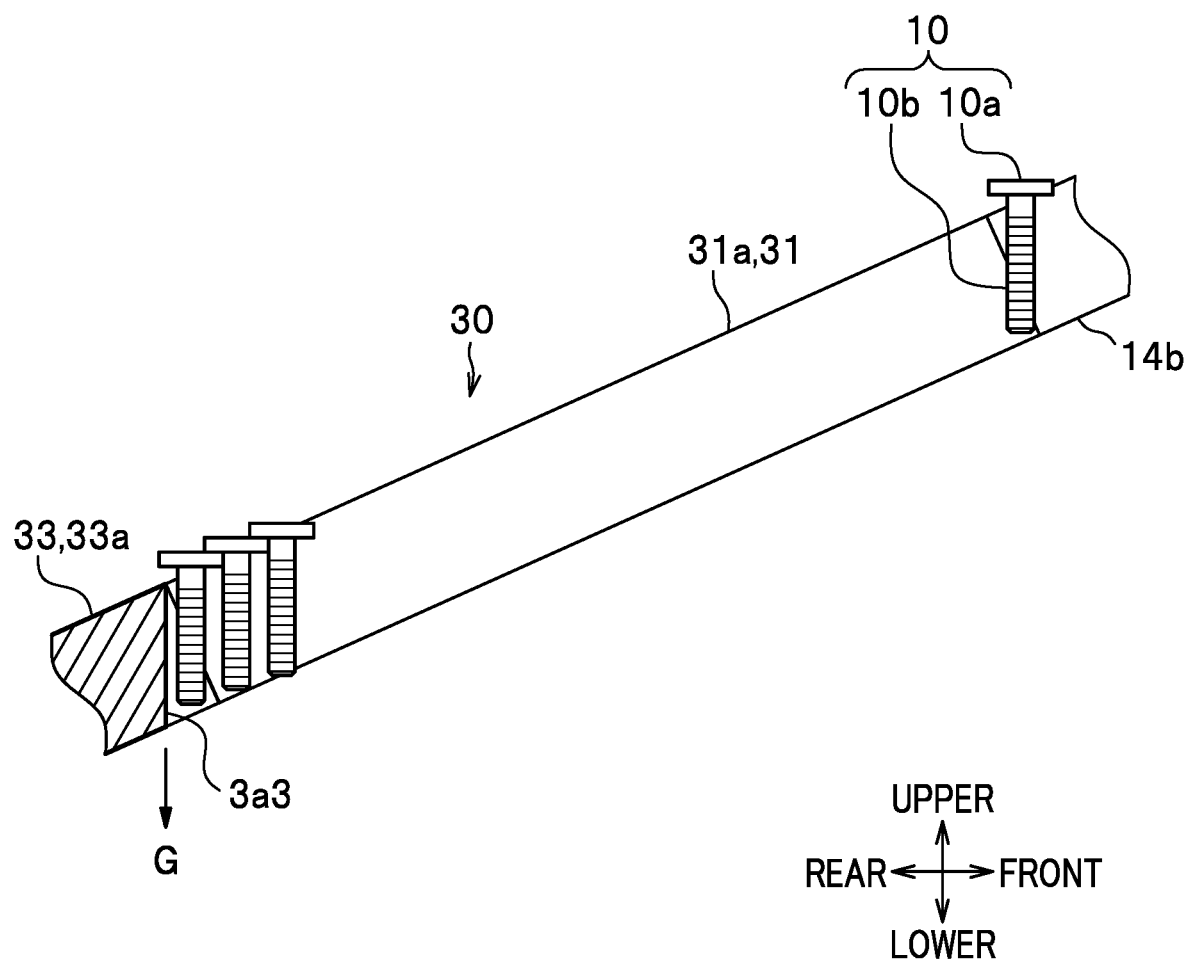
FIG. 5 is a schematic side view illustrating bolts hanging down in holding rails of the bolt escapement device and a longitudinal side surface of a blade.

As seen in FIG. 5, bolts 10 in the upright position flow continuously by natural fall such that the head portion 10a of each bolt 10 is bridged between the rails 14b and the threaded portion 10b hangs down in the rails 14. The bolts 10 then flow one after another to the holding rails 31 of the bolt escapement device 30.

As seen in FIG. 3, the bolt escapement device 30 includes the holding rails 31 continuously connected to the rear ends of the rails 14b and extending obliquely toward the rear side, and a horizontally oriented bolt escapement unit 32 orthogonal to the rail axis that extends straight from the front ends (upstream ends) to the rear ends (downstream ends) of the holding rails 31. The bolt escapement unit 32 has a horizontally oriented rectangular prism shape, and upper and lower surfaces thereof are inclined at the same angle as the holding rails 31.

Figure 6:
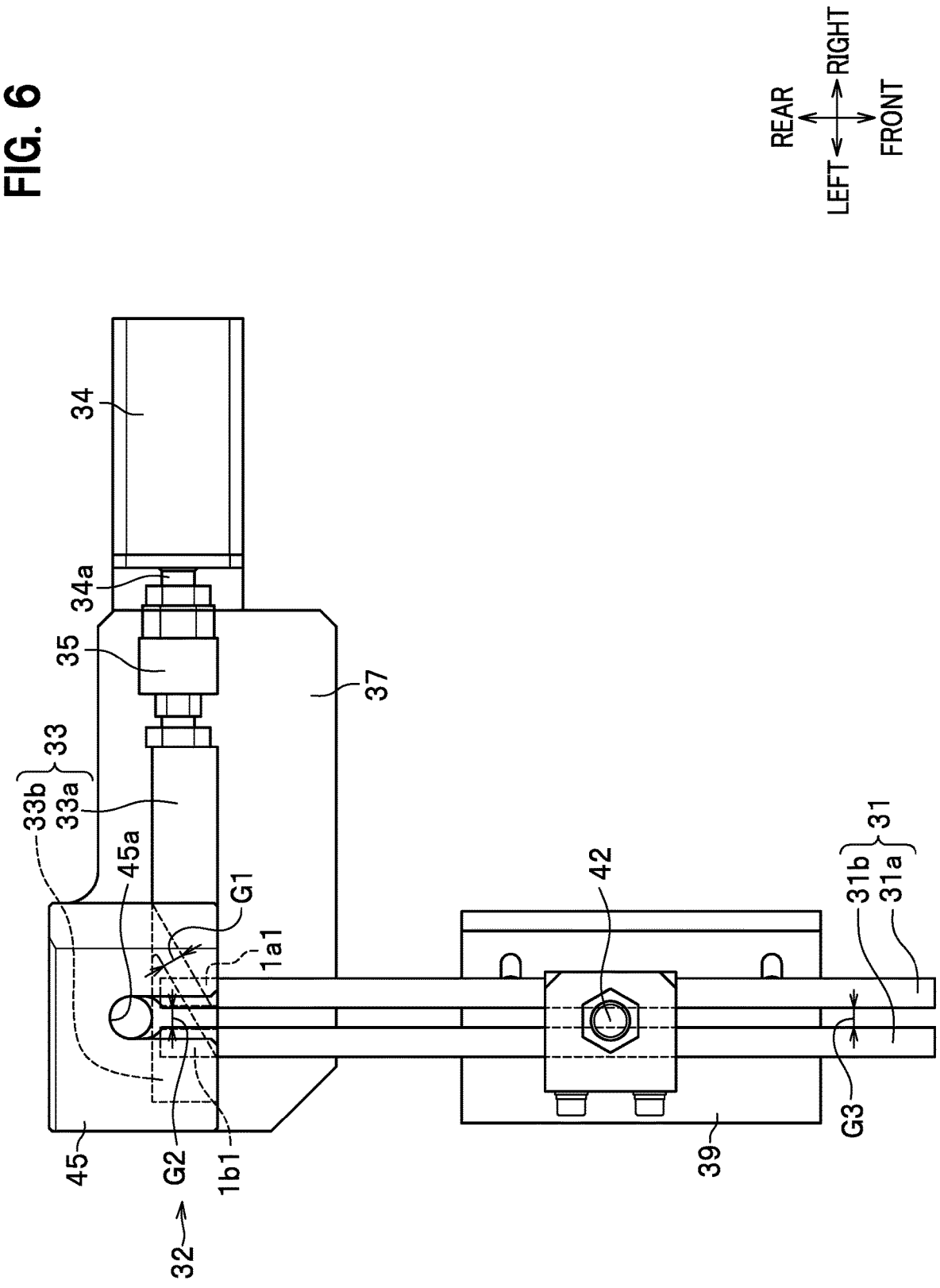
FIG. 6 is a plan view of the bolt escapement device with a rail cover, a chute cover, and a rod cover being removed.

The holding rails 31 include two parallel rails 31a, 31b (see FIG. 6). As represented by one rail 31a in FIG. 5, the rail 31a is continuously connected to the rear end of the rail 14b at a side closer to the bolt feeding unit 23 and extends obliquely toward the rear side.

The holding rails 31 are configured to suspend bolts 10 flowing down from the rails 14b in the upright posture and allow them to flow by natural fall toward the blade 33 of the bolt escapement unit 32 (see FIG. 6). At this time, the bolts 10 hang down in a position indicated by the arrow G in the direction of gravity. In other words, the bolts 10 take the vertical position (vertical posture). According to this embodiment, the bolts 10 hang down in the direction of gravity G (vertical direction) in the holding rails 31. However, the bolts 10 may be slightly inclined from the direction of gravity G.

The bolts 10 having flowed longitudinally along the holding rails 31 are separated and released one-by-one by the lateral bolt-releasing operation of the blade 33. As described later, the bolts 10 located in the rails are shielded by a longitudinal side surface 3a3 of the blade 33 and held by the holding rails 31. The longitudinal side surface 3a3 constitutes the closure portion defined in the claims.

Figure 7:
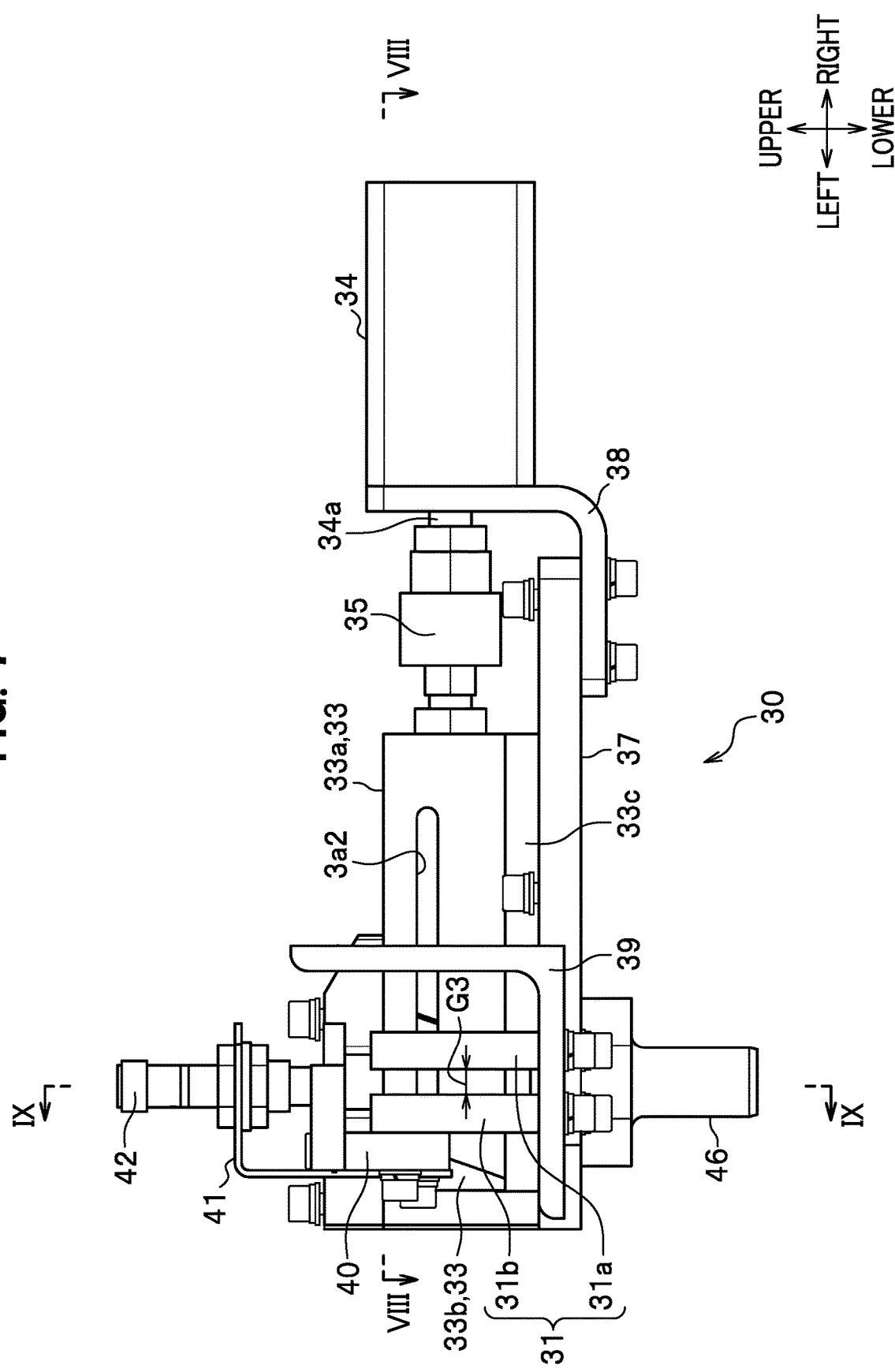
FIG. 7 is a view illustrating the configuration of the bolt escapement device shown in FIG. 3 projected in the direction of arrow Y2 from the front end toward the rear end thereof along the inclination of the slope of the holding rails.
Figure 8:
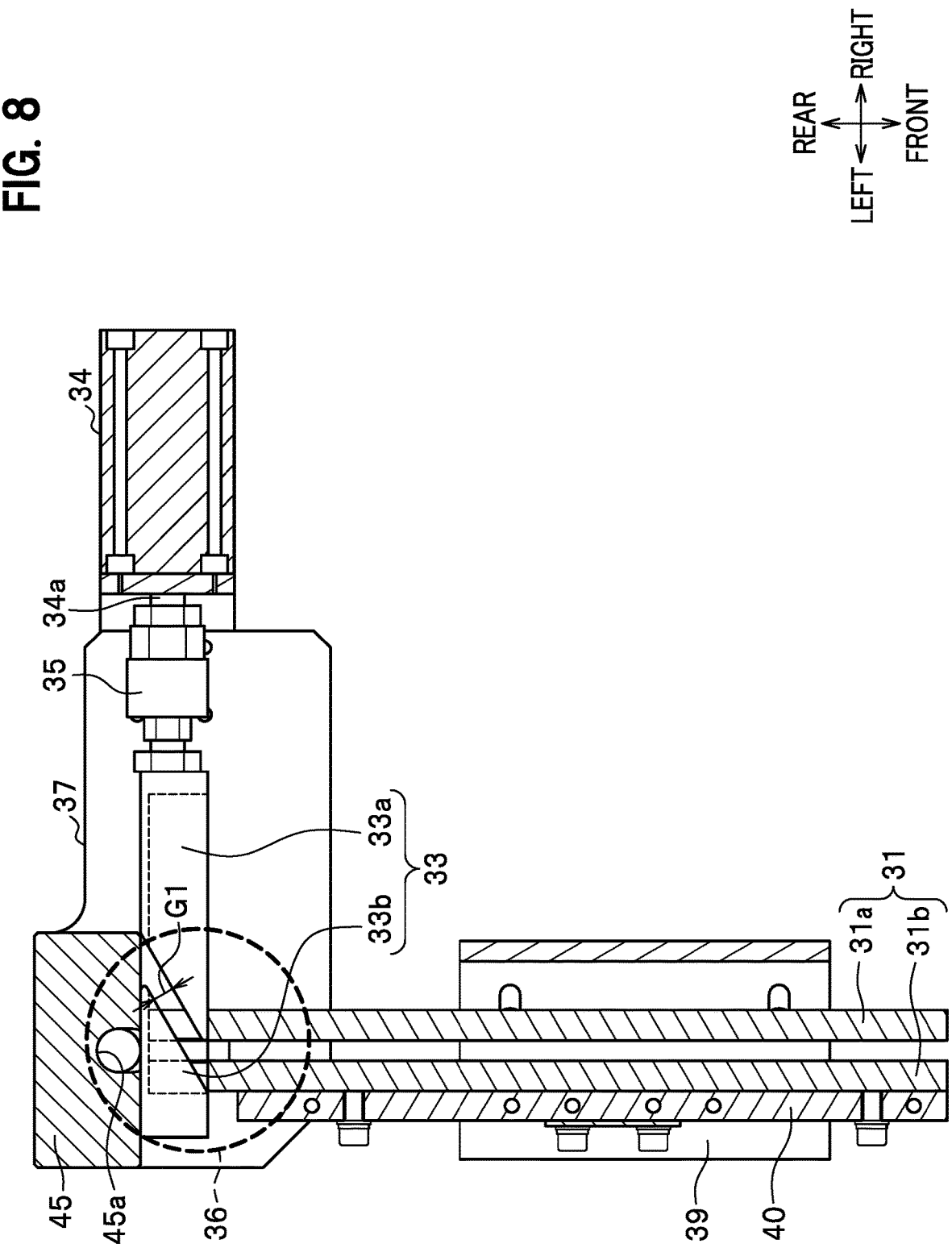
FIG. 8 is a cross-sectional view illustrating the cross-sectional configuration taken along the line VIII-VIII of FIG. 7.
Figure 9:
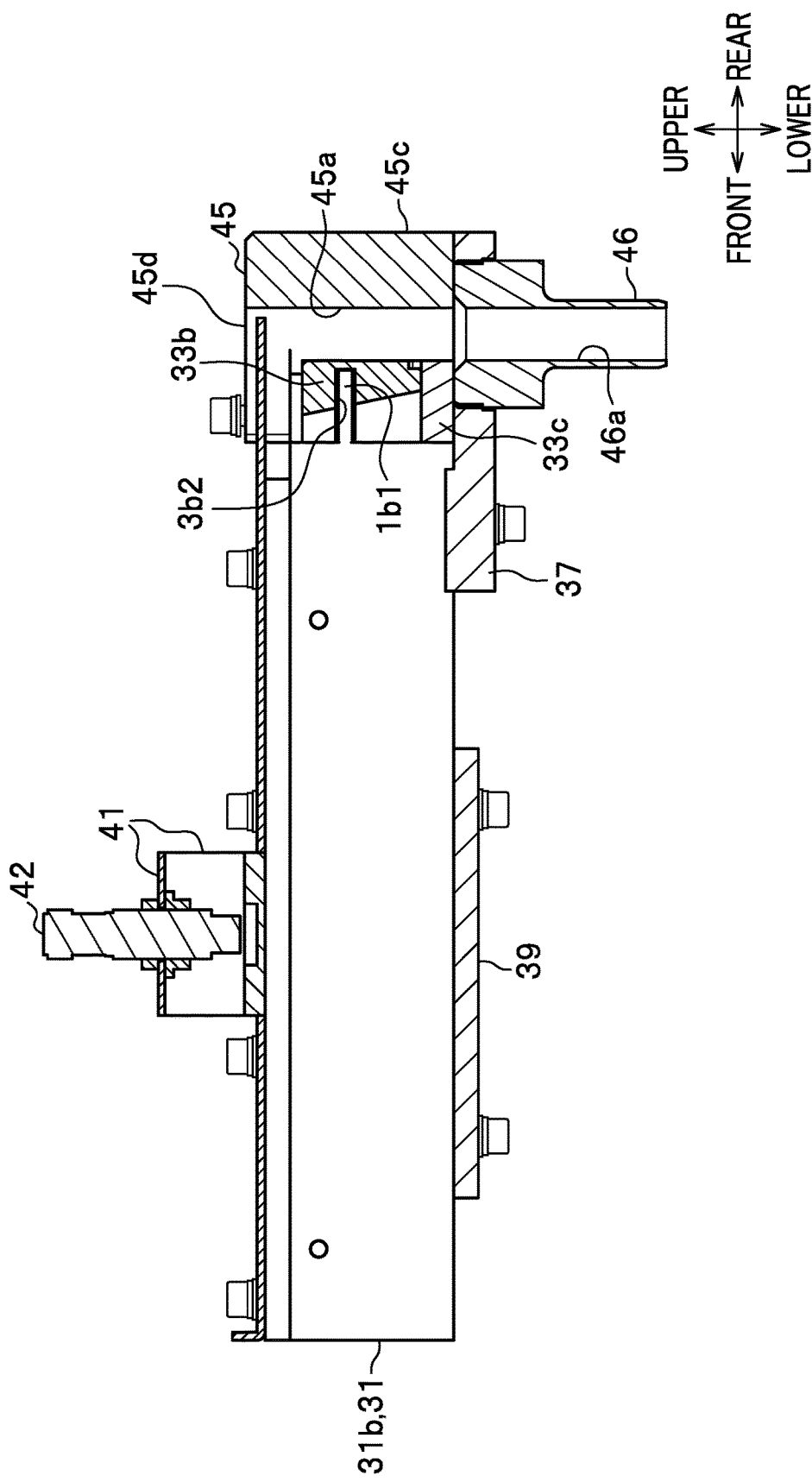
FIG. 9 is a cross-sectional view illustrating the cross-sectional configuration taken along the line IX-IX of FIG. 7.

FIG. 6 shows a plan view of the bolt escapement device 30 shown in FIG. 3 with a rail cover 31c, a chute cover 32a, and a rod cover 32b being removed. FIG. 7 shows the configuration of the bolt escapement device 30 shown in FIG. 3 projected in the direction indicated by the arrow Y2, i.e., from the front end toward the rear end thereof along the inclination of the slope of the holding rails 31. FIG. 8 is a cross-sectional view illustrating the cross-sectional configuration taken along the line VIII-VIII of FIG. 7, and FIG. 9 is a cross-sectional view illustrating the cross-sectional configuration taken along the line IX-IX of FIG. 7.

The bolt escapement device 30 shown in FIG. 6 includes a cylinder 34 and a blade 33 that are arranged in a direction orthogonal to the rail axis of the holding rails 31, at the rear end side of the longitudinal holding rails 31. Upper and lower surfaces of the cylinder 34 and the blade 33 are also inclined at the same angle as the holding rails 31 (see FIG. 3).

The cylinder 34 has a horizontally oriented rectangular prism shape that extends in a direction orthogonal to the rail axis, and includes a piston rod 34a that can freely extend or retract to move back and forth.

Figure 11:
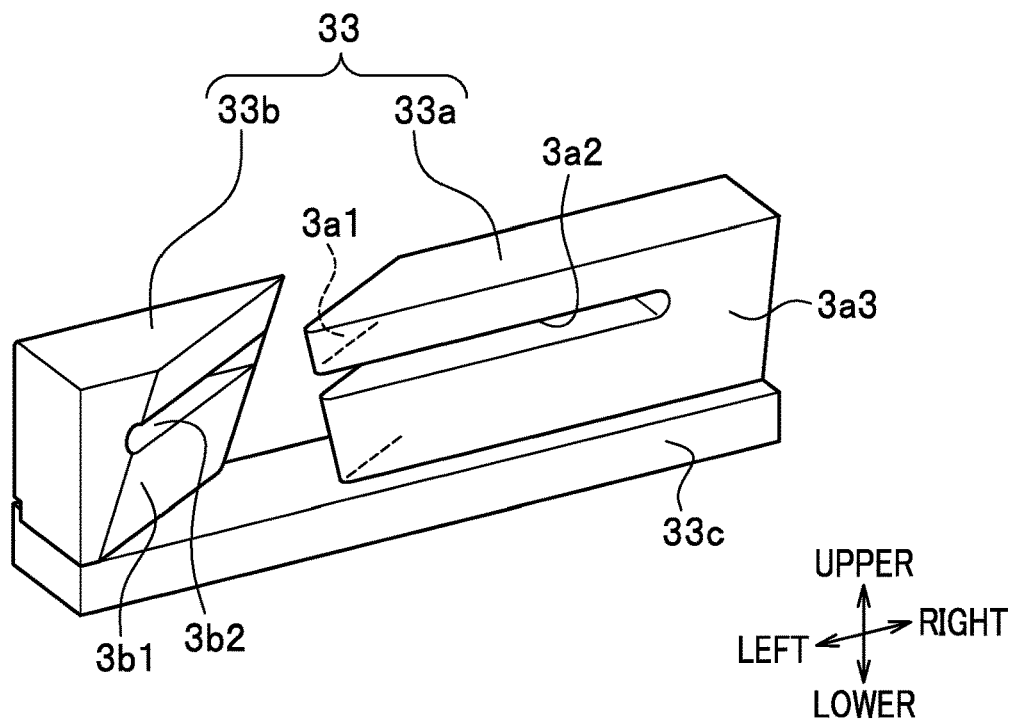
FIG. 11 is a perspective view of the blade.

The blade 33 has a long and narrow rectangular prism shape extending in a blade axis orthogonal to the rail axis and is fixed to the tip end of the piston rod 34a through a joint member 35. The blade 33 includes a first blade 33a and a second blade 33b (shown by broken lines) that are spaced apart from each other by an inclined gap G1 and fixed on a long and narrow plate-like blade base 33c (FIG. 11). The blade 33 may intersect the rail axis at an angle other than right angles and may be movable in this intersecting direction. In this embodiment, the blade 33 moves in a direction orthogonal to the rail axis. The inclined gap G1 constitutes a bolt passageway defined in the claims. The first blade 33a and the second blade 33b constitute a blade body defined in the claims.

As seen in FIG. 7, the blade base 33c is fixed on top of a plate-like chute base 37. Fixed to the right bottom surface of the chute base 37 is a horizontal surface of a bracket 38 having an L-shaped profile when viewed from side. The cylinder 34 is fixed to the vertical surface of the bracket 38 that is perpendicular to the horizontal surface of the bracket 38.

As seen in FIG. 6, the holding rails 31 are configured such that the lower surfaces of the parallel rails 31a, 31b are fixed to a separator base 39. The separator base 39 is L-shaped when viewed from the front side (FIG. 7) and rectangular in plan, and is fixed to the holding rails 31 at a position offset toward the front ends of the holding rails 31.

As seen in FIG. 8, a rail-shaped plate 40 that is shorter than the rail 31b is fixed to the left side of the left rail 31b. The front end of the plate 40 lies flush with the front end of the rail 31b, and the rear end of the plate 40 is located more frontward than the rear end of the rail 31b. Further, as seen in FIG. 7, the plate 40 is fixed to the rail 31b such that a little more than a lower half portion of the plate 40 is fixed to an upper half portion of the rail 31b and a little less than an upper half portion of the plate 40 protrudes upward from the rail 31b.

A proximity sensor 42 is fixed to the left side of the plate 40 using a bracket 41. The bracket 41 is inverted L-shaped when viewed from the front side. The proximity sensor 42 is fixed over a rail gap G3 of the holding rails 31, and as seen in FIG. 6, the proximity sensor 42 is disposed in a position slightly frontward of the center of the holding rails 31 in the front-rear direction. As seen in FIG. 5, the proximity sensor 42 detects a head portion 10a of a metal bolt 10 hanging down in the gap G1 between the rails 31a, 31b.

The detection of the proximity sensor 42 is made when bolts 10 are accumulated in the holding rails 31 from the blade 33 and a bolt 10 stays under the proximity sensor 42 for a predetermined period of time or longer. After this detection, a control unit 22a shown in FIG. 2 stops the motor 26, so that the bolt feeding unit 23 stops supply of bolts 10 (FIG. 4). The detection of the bolt 10 is released when the bolt 10 is not present under the proximity sensor 42, and the control unit 22a starts the motor 26, so that the bolt feeding unit 23 starts the supply of bolts 10.

Figure 10:
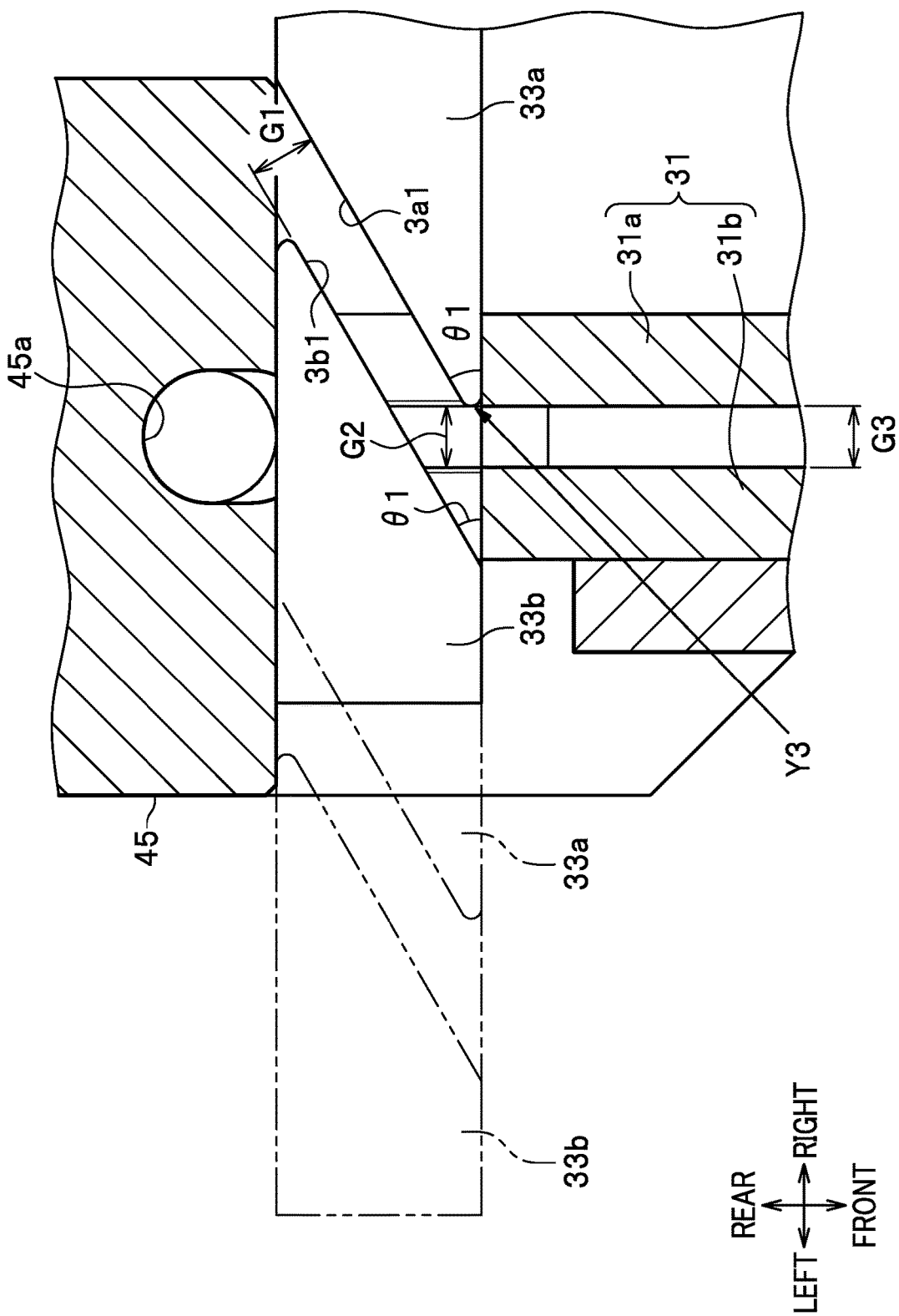
FIG. 10 is an enlarged plan view illustrating the portion shown by the circle frame 36 of FIG. 8.

Next, as seen in FIG. 10, in which the circle frame 36 of FIG. 8 is enlarged, the front side of the first blade 33a (left side on the drawing) and the rear side of the second blade 33b (right side on the drawing) are provided with inclined surfaces 3a1, 3b1; the inclined surfaces 3a1, 3b1 extend obliquely at an angle θ1 with respect to the laterally extending blade axis orthogonal to the rail axis of the holding rails 31 and are parallel to and opposite to each other. It should be noted that the angle θ1 is an acute angle. In this embodiment, the angle θ1 is 30 degrees.

In other words, the blades 33a, 33b are fixed to the blade base 33c (FIG. 11) with the opposing inclined surfaces 3a1, 3b1 thereof being spaced apart by the inclined gap G1 that is inclined at an angle θ1 with respect to the blade axis and extends parallel to the inclined surfaces 3a1, 3b1. The inclined gap G1 is sized to have the same dimension as the rail gap G3 defined between the parallel rails 31a, 31b constituting the holding rails 31 and a guide gap G2 formed between bolt guides 5b1, 5b1 of a chute 45 (FIG. 14) to be described later. The inclined gap G1 is slightly larger than the diameter of the threaded portion 10b of the bolt 10. It should be noted that all of or any of the inclined gap G1, the guide gap G2, and the rail gap G3 may have different gap widths as long as they are larger in width than the diameter of the threaded portion 10b to allow the bolts 10 to pass therethrough.

This dimension makes it possible to allow the bolts 10 hanging down between the rails 31a, 31b (see FIG. 5) to pass smoothly through the rail gap G3, the guide gap G2, and the inclined gap G1. To allow the bolts 10 to pass through the inclined gap G1, it is necessary that upper and lower sides of the inclined gap G1 be aligned with the guide gap G2.

Figure 12:
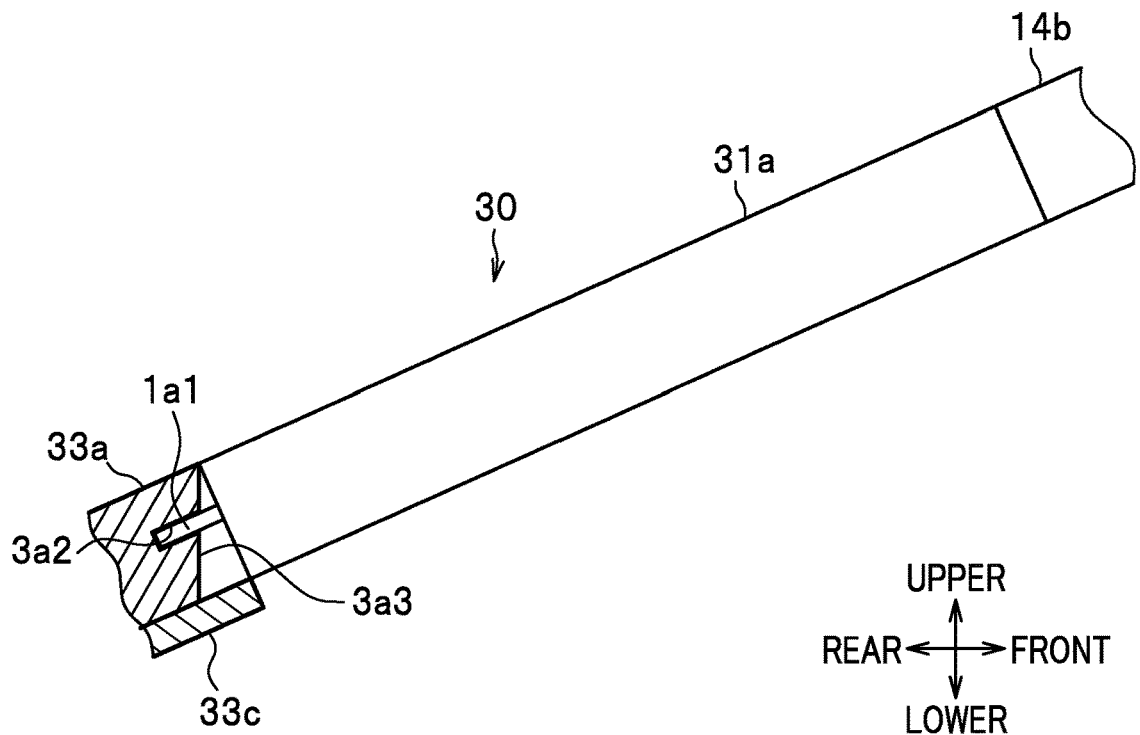
FIG. 12 is a partial cross-sectional view illustrating the state in which a projection of a holding rail is inserted into a guide groove formed in a longitudinal side surface of a first blade.

As seen in FIG. 11, the longitudinal side surface 3a3 of the first blade 33a facing the holding rails 31 (FIG. 10) has a long and narrow recess-shaped guide groove 3a2 (FIG. 7) formed along the longitudinal direction of the longitudinal side surface 3a3. The guide groove 3a2 is formed at a position slightly upward of the vertical center of the longitudinal side surface 3a3 and extends straight from near the right end (near the portion fixed to the piston rod 34a) through the inclined surface 3a1. As seen in FIG. 12, the depth of the guide groove 3a2 is set such that a projection 1a1 protruding from the rear end of the rail 31a (see FIG. 13) can be inserted into the guide groove 3a2 for a predetermined length.

As seen in FIG. 5, the longitudinal side surface 3a3 of the first blade 33a is configured to form a wall surface rising in the same direction as bolts 10 hanging down in the direction of gravity G (vertical direction) from the holding rails 31 that are arranged obliquely at a predetermined angle.

Since the longitudinal side surface 3a3 and the bolts 10 are parallel, the longitudinal side surface 3a3 intercepts the bolt 10 without any resistance when the first blade 33a moves in a direction orthogonal to the holding rails 31. For this reason, the first blade 33a moves smoothly without getting caught against the bolts 10 retained vertically in the holding rails 31. The longitudinal side surface 3a3 may not be a wall surface parallel to the bolts 10, but may be a wall surface slightly inclined toward or away from the bolts 10, as long as the first blade 33a can move without getting caught against the bolts 10.

As seen in FIG. 11, a recess-shaped guide groove 3b2 is formed in the inclined surface 3b1 of the second blade 33b. This guide groove 3b2 is formed at the same height as the guide groove 3a2 of the first blade 33a, and extends transversely through front and rear ends of the inclined surface 3b1. The guide grooves 3a2, 3b2 constitute a guide groove defined in the claims.

As seen in FIG. 6, each of the guide grooves 3a2, 3b2 has a depth such that the projection 1a1 of the rail 31a and the projection 1b1 of the rail 31b are inserted by the same depth when the blade 33 is located at a reference position, at which the piston rod 34a is fully contracted. In this inserted state, the blades 33a, 33b can smoothly move laterally along the blade axis in the directions where the piston rod 34a extends or retracts as indicated by the arrow Y4 of FIG. 13. The reference position constitutes a first position defined in the claims. The position, at which the outlet of the inclined gap G1 is aligned with a chute hole 45a is a second position defined in the claims.

As indicated by the arrow Y3 of FIG. 10, when the blade 33 is located at the reference position, a corner portion where a longitudinal edge of the inclined surface 3a1 of the first blade 33a and a longitudinal edge of the longitudinal side surface 3a3 meet is aligned with the extension line extending along the rail axis of the inner surface of the rail 31a (aligned state). Therefore, the first blade 33a is fixed while adjusting the length of the joint member 35 (FIG. 6) to attain the aligned state when the piston rod 34a is fully contracted.

Further, when the blade 33 is located at the reference position, the inlet of the inclined gap G1 of the blade 33 is aligned with the rail gap G3, so that the bolts 10 flowing through the rail gap G3 (see FIG. 5) can move smoothly into the guide gap G2 and the inclined gap G1.

When the piston rod 34a starts to extend immediately after the bolts 10 move, a bolt 10 located at the rear side in the holding rails 31 is blocked by the longitudinal side surface 3a3 of the first blade 33a and retained in the holding rails 31.

A chute 45 is fixed to the chute base 37 shown in FIG. 6 at a position rearward of the blade 33. As seen in FIG. 9, the chute 45 has a generally inverted L-shape including a vertical portion 45c rising on the chute base 37 and a horizontal portion 45d extending horizontally from the upper portion of the vertical portion 45c over the blade 33 toward the holding rails 31 (toward the rails).

Figure 14:
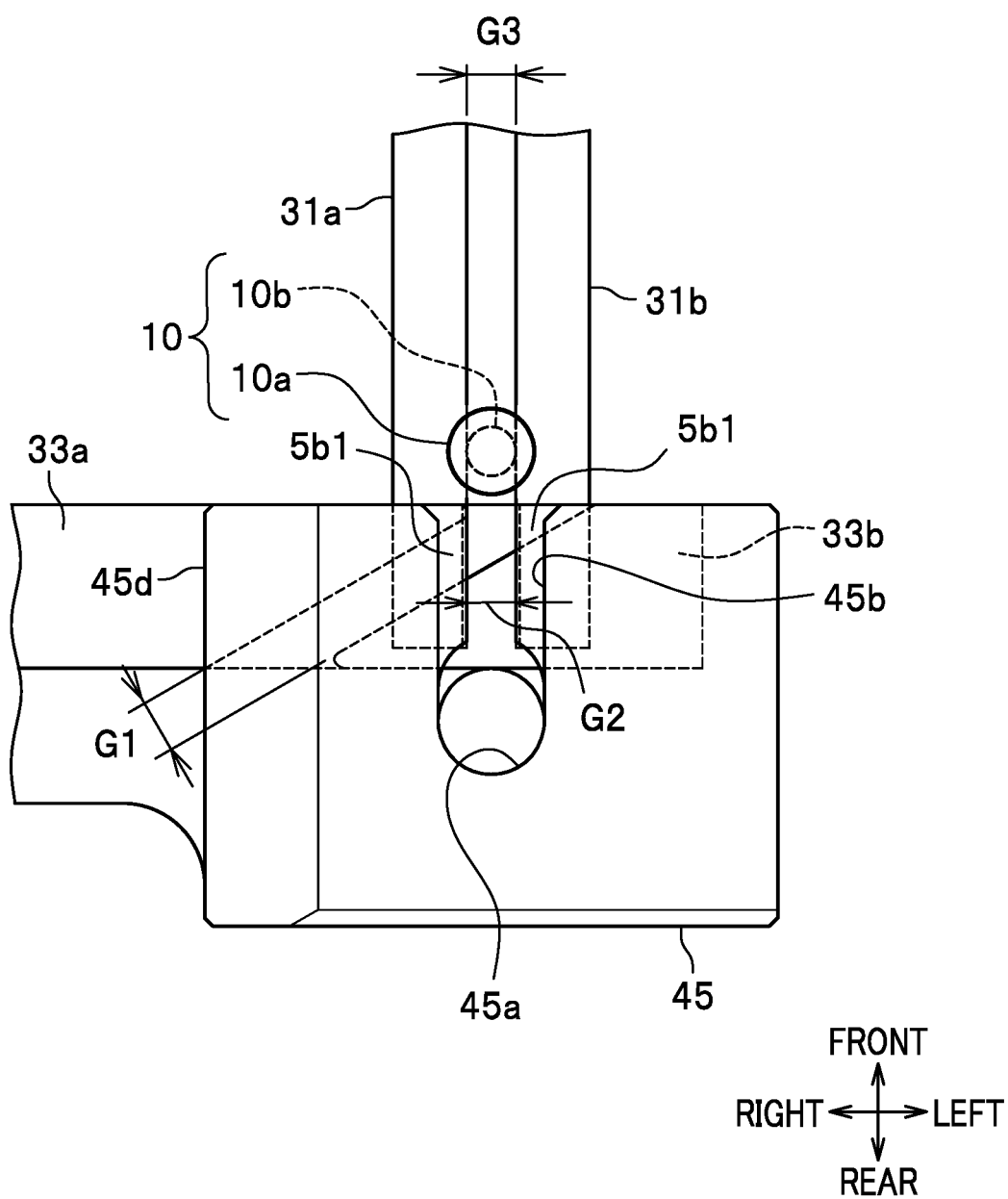
FIG. 14 is an enlarged plan view illustrating the holding rails, a chute, the blade, etc. shown in FIG. 6.

A chute hole 45a (FIG. 8) extending vertically through the vertical portion 45c and the horizontal portion 45d that form the inverted L-shape is formed at a position rearward of the blade 33. As seen in FIG. 14, the chute hole 45a is formed so that a generally semi-cylindrical groove (a little more than half of the chute hole 45a) that is formed to extend vertically through the horizontal portion 45d and the vertical portion 45c is closed by the rear surfaces of the blade 33 and the blade base 33c.

As seen in FIG. 14, the chute hole 45a has a diameter larger than that of the head portion 10a of the bolt 10. An opening 45b is formed at a lateral portion 45d of the chute 45. The opening 45b is in communication with the chute hole 45a and extends to open toward the rails. The opening 45b is open toward the rails and open on the upper side, and parallel bolt guides 5b1, 5b1 are provided on the opposing inner surfaces of the opening 45b.

The gap between the parallel bolt guides 5b1, 5b1 (guide gap G2) has a width same as that of the rail gap G3 between the rails 31a, 31b and is aligned with the rail gap G3. Upper surfaces of the bolt guides 5b1, 5b1 are flush with upper surfaces of the rails 31a, 31b.

When the front opening (inlet) of the inclined gap G1 is aligned at the lower side of the guide gap G2, the threaded portions 10b of the bolts 10 having flowed through the rail gap G3 of the rails 31a, 31b in the vertical position flow into the guide gap G2 and the inclined gap G1 by natural fall. After that, when the blade 33 moves to the right (direction indicated by the arrow Y4 in FIG. 13) and the rear opening (outlet) of the inclined gap G1 is aligned with the chute hole 45a in the front-rear direction, the bolt 10 moving through the guide gap G2 and the inclined gap G1 flows into the chute hole 45a while maintaining the vertical position.

As seen in FIG. 9, a tube joint 46 with an air tube hole 46a is fixed under the chute 45 provided with the chute hole 45a such that the chute hole 45a and the air tube hole 46a are aligned with each other in the vertical direction. The chute hole 45a and the air tube hole 46a constitute a through hole defined in the claims.

Operation of this Embodiment

Next, explanation will be given of the operation of releasing one bolt 10 at a time by the above-described bolt escapement device 30 of the bolt feeding apparatus 20. It should be noted that the hopper 27 of the bolt feeding unit 23 contains a large number of bolts 10.

First, when the operator performs a startup operation using the operation panel 21 of the bolt feeding unit 23 shown in FIG. 2, the control unit 22a starts the motor 26 to rotate the rotating plate 12 shown in FIG. 4 in the direction indicated by the arrow Y1. This rotation causes a plurality of bolts 10 in the hopper 27 to be attracted to the surface of the rotating plate 12 by the magnets 15 and to be conveyed toward the gap 13a of the sorting block 13.

These conveyed bolts 10 pass through the gap 13a in the inverted posture and move toward the rails 14a shown in FIG. 3. Further, the bolts 10 flow through the rails 14a in the inverted posture by natural fall, and then the bolts 10 are inverted to the upright posture while flowing through the rails 14b. As seen in FIG. 5, the bolts 10 in the upright posture flow continuously by natural fall with the head portions 10a being bridged between the rails 14b and with the threaded portions 10b hang down, and then the bolts 10 flow sequentially to the holding rails 31 of the bolt escapement device 30.

Figure 15:
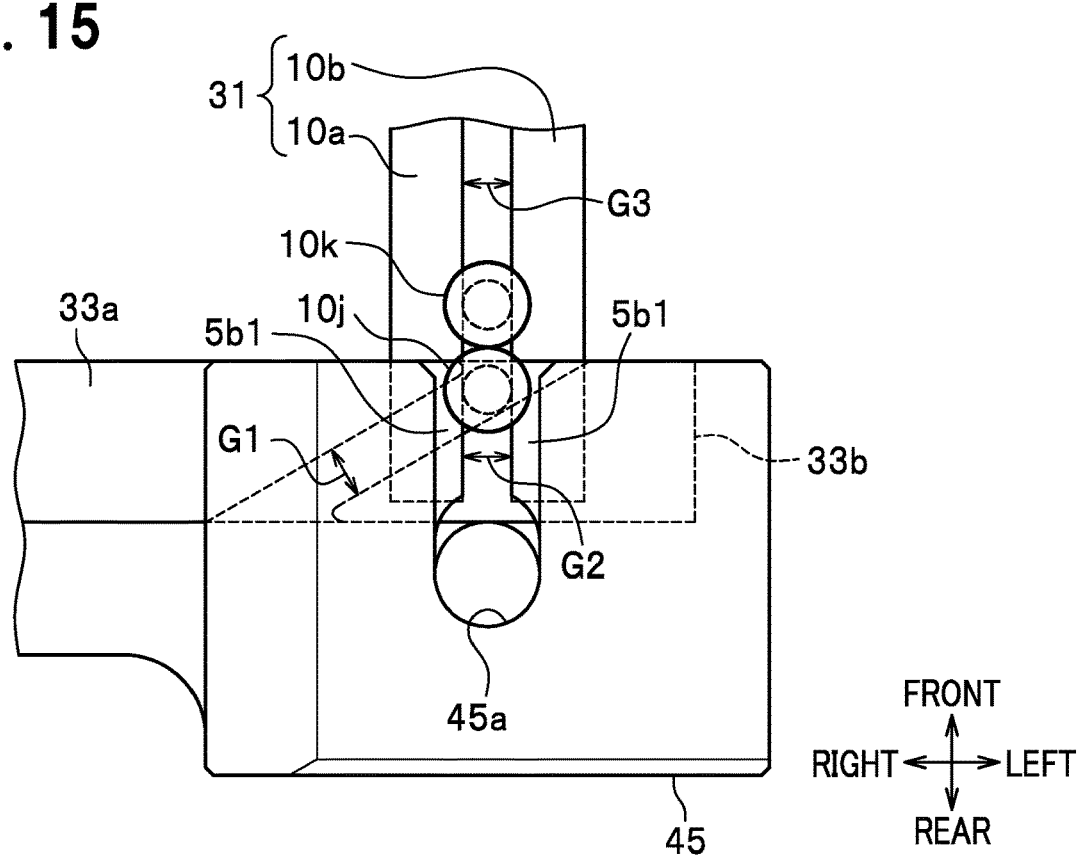
FIG. 15 is a first plan view of the holding rails, the chute, the blade, etc. explaining the operation of the bolt escapement device for releasing bolts.

At this time, the bolt escapement device 30 operates such that the blade 33 is positioned in the reference position as seen in FIG. 6 and that as seen in FIG. 15, the inlet of the inclined gap G1 formed between the blades 33a, 33b is aligned vertically with the inlet of the guide gap G2 located above the inclined gap G1 and is also aligned with the outlet of the rail gap G3 (from which the bolts 10 exit) in the direction of the rail axis.

In this state, as seen in FIG. 15, the bolts 10 flowing sequentially through the holding rails 31 enter the guide gap G2 and the inclined gap G1 from the rail gap G3. The bolt having entered the guide gap G2 and the inclined gap G1 is referred to as the bolt 10j, and the bolt located behind the bolt 10j (closer to the rails 31) in the moving direction of the bolt 10j is referred to as the bolt 10k.

Figure 16:
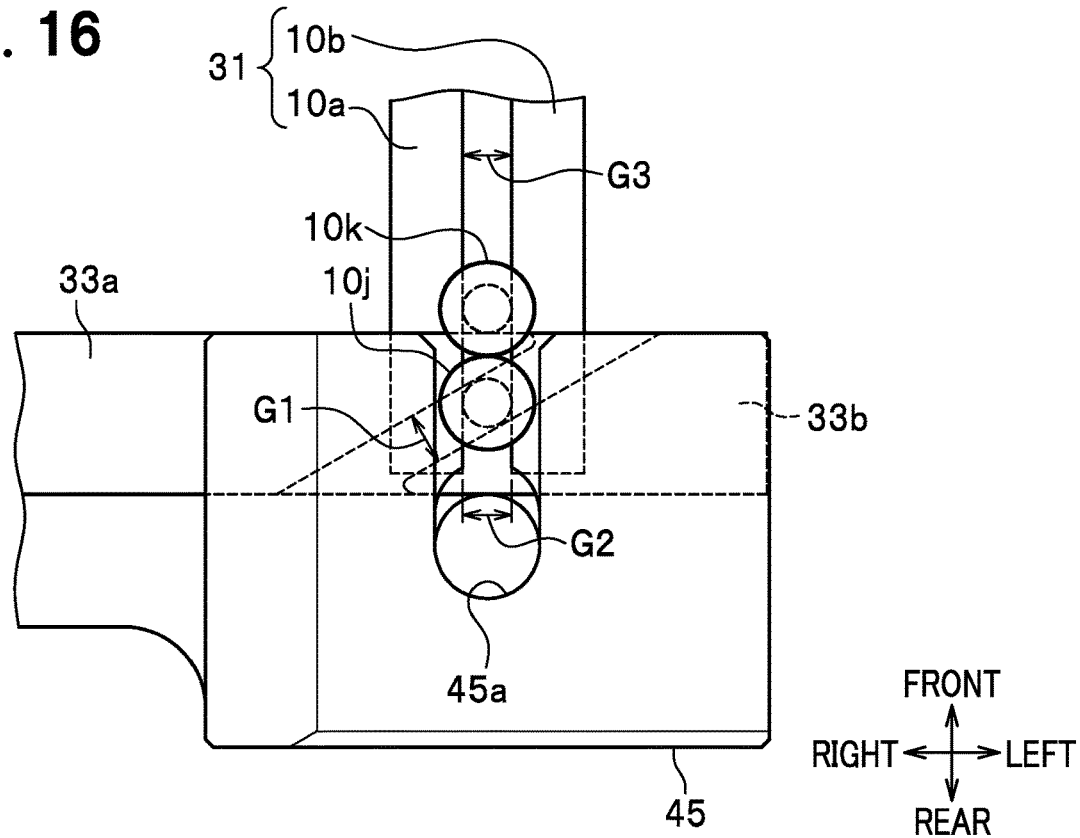
FIG. 16 is a second plan view of the holding rails, the chute, the blade, etc. explaining the operation of the bolt escapement device for releasing bolts.

Next, the piston rod 34a (FIG. 6) moves to the left, and as seen in FIG. 16, the inclined gap G1 between the blades 33a, 33b moves to the left side of the rail gap G3 (left shift). At this time, the bolt 10j having entered the inclined gap G1 moves toward the chute hole 45a according to the left shift of the inclined gap G1. The bolt 10k behind this bolt 10j is blocked by the longitudinal side surface 3a3 of the first blade 33a to be moved leftward and thus stays in the rail gap G3.

Figure 17:
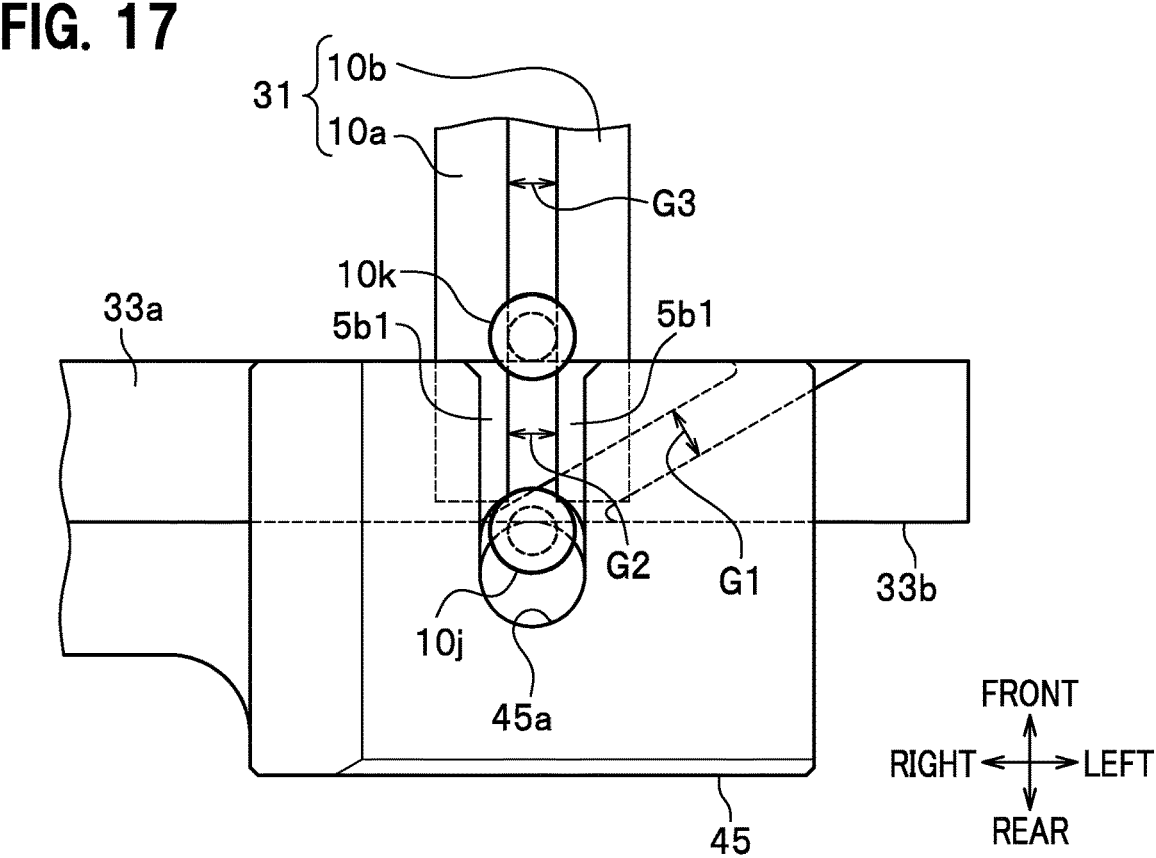
FIG. 17 is a third plan view of the holding rails, the chute, the blade, etc. explaining the operation of the bolt escapement device for releasing bolts.

The piston rod 34a moves further to the left, and as seen in FIG. 17, the outlet of the inclined gap G1 is aligned with the chute hole 45a in the front-rear direction. At this time, the bolt 10j enters the chute hole 45a through the outlets of the inclined gap G1 and the guide gap G2, while the bolt 10k behind the bolt 10j is blocked by the longitudinal side surface 3a3 of the blade 33a and thus remains in rail gap G3.

Figure 13:
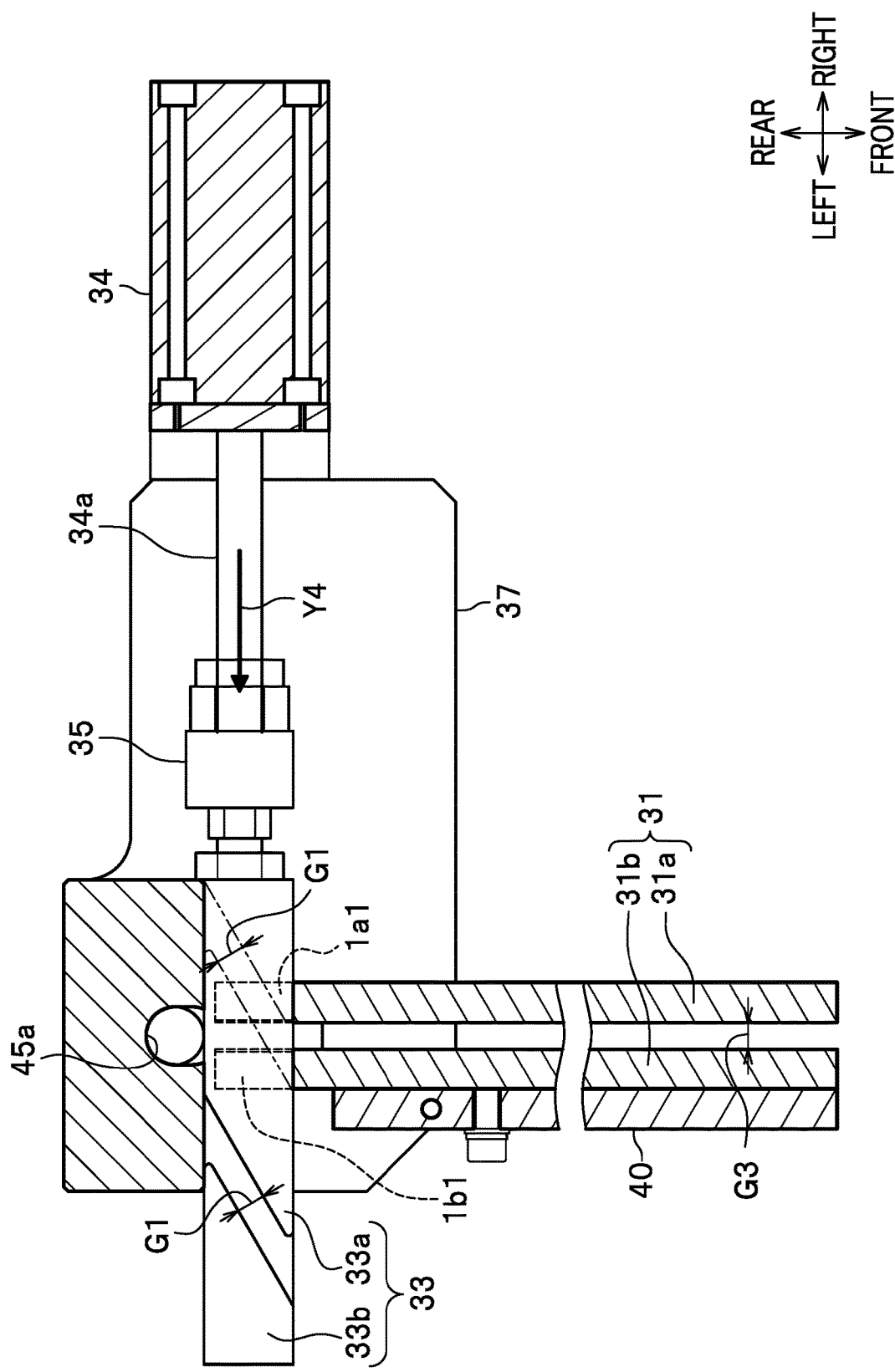
FIG. 13 is a horizontal cross-sectional view illustrating the state in which the blade has been moved by a piston rod extended outward.
Figure 18:
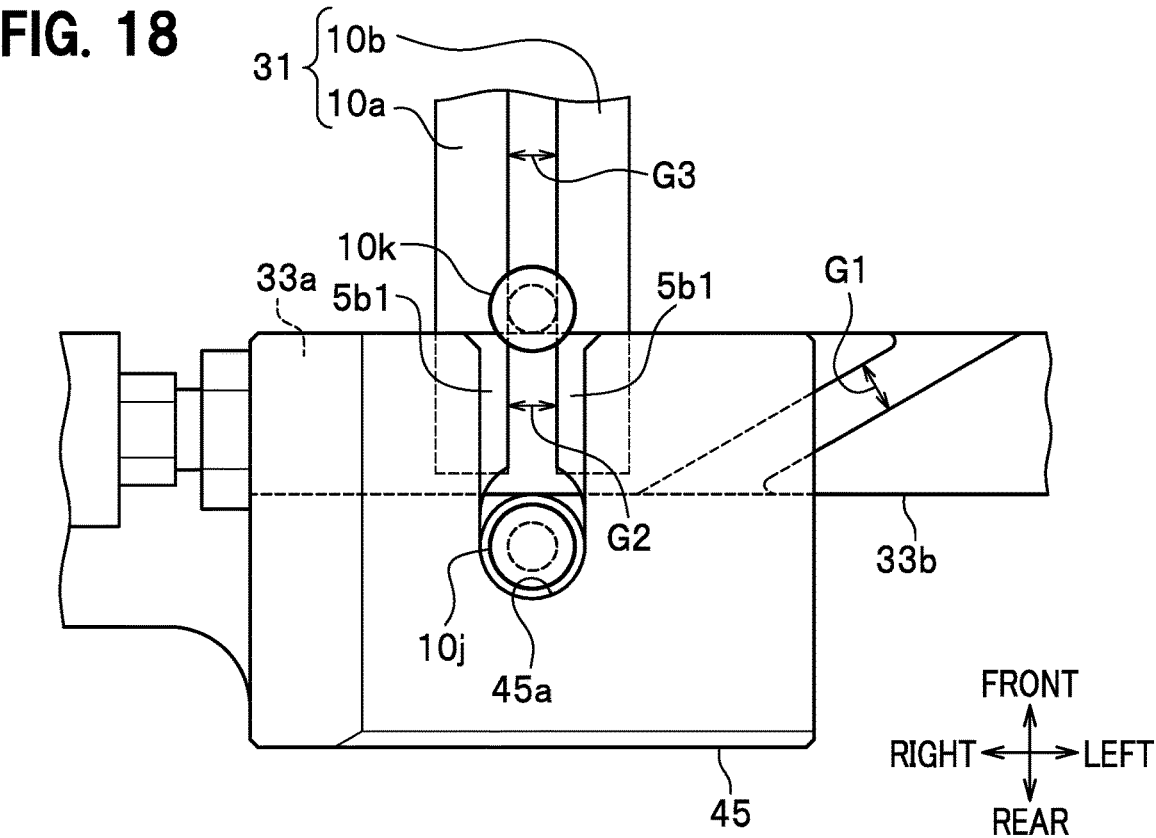
FIG. 18 is a fourth plan view of the holding rails, the chute, the blade, etc. explaining the operation of the bolt escapement device for releasing bolts.

The piston rod 34a moves further to the left as indicated by the arrow Y4 of FIG. 13, and as seen in FIG. 18, the blades 33a, 33b move to the left, away from the position of the chute hole 45a. At this time, the blade 33a closes the guide gap G2 between the bolt guides 5b1 to expose only the chute hole 45a (through hole). This closing movement causes only the chute hole 45a containing the bolt 10 to be exposed. Accordingly, the bolt 10j enters the chute hole 45a and is smoothly sucked into the air tube hole 46a. The subsequent bolt 10k is blocked by the longitudinal side surface 3a3 of the blade 33a, and thus remains in the rail gap G3.

When the bolts 10 get accumulated in the holding rails 31 and reach the position under the proximity sensor 42 shown in FIG. 6, the proximity sensor 42 detects a bolt 10 having stayed under the proximity sensor 42 for a predetermined period of time or longer. After this detection, the control unit 22a shown in FIG. 2 stops the motor 26 to stop the supply of bolts 10 from the bolt feeding unit 23. After that, when no bolt 10 is present under the proximity sensor 42 and the detection of the bolt 10 is released, the control unit 22a starts the motor 26 to start the supply of bolts 10 from the bolt feeding unit 23.

Thereafter, as with the bolt 10j having been sucked into the air tube hole 46a, the bolt 10k retained in the rails 31 also passes through the chute hole 45a and is sucked into the air tube hole 46a by repeating the operations shown in FIGS. 15 to 18. As described above, in the bolt escapement device 30, the bolts 10 having flowed continuously through the holding rails 31 are fed one-by-one to the air tube hole 46a and conveyed to the subsequent welding process.

Advantageous Effects of this Embodiment

As explained above, the bolt escapement device 30 of this embodiment is configured to release one bolt 10 at a time from bolts 10 flowing continuously in a predetermined posture through rails and supply it to the subsequent process. According to this embodiment, the bolt escapement device 30 has the following characteristic configurations.

(1) The bolt escapement device 30 includes the holding rails 31 configured to hold a plurality of bolts 10 hanging down in the rail gap G3 while conveying the bolts 10 downstream. Further, the bolt escapement device 30 includes the blade 33 disposed downstream of the holding rails 31 and configured to release the bolts 10 one-by-one from the holding rails 31, and the chute 45 disposed downstream of the blade 33 and having the through hole (the chute hole 45a and the air tube hole 46a), through which a bolt 10 having been released is dropped down.

The blade 33 includes: the blade body configured to reciprocate in a direction intersecting the holding rails 31 to pass through the first position (the reference position) and the second position (the position at which the outlet of the inclined gap G1 is aligned with the chute hole 45a); the inclined gap G1 extending in the blade body in a direction acute to the moving direction of the blade body and allowing a bolt 10 having been released to pass therethrough; and the closure portion provided on the side surface (the longitudinal side surface 3a3) of the blade body that is closer to the holding rails 31 and configured to close the rail gap G3.

The upstream side of the inclined gap G1 communicates with the rail gap G3 when the blade body is in the first position, and the downstream side of the inclined gap G1 communicates with the through hole when the blade body is in the second position. At least one of the holding rails 31 and the chute is provided with the bolt guides 5b1; the bolt guides 5b1 intersect the inclined gap G1 and configured to guide the bolts from the outlet of the rail gap G3 to the through hole.

When the blade body moves from the first position to the second position, the corner portion of the inclined gap G1 that is closer to the holding rails 31 is inserted between the bolt 10j having entered the inclined gap G1 and the subsequent bolt 10k and the rail gap G3 is closed by the closure portion.

According to this configuration, the following advantageous effects are obtained. It should be noted that since the blade body is included in blade 33, the blade body is hereinafter referred to as the blade 33. First, the inclined gap G1 of the blade 33 comes into alignment with the guide gap G2 that is located above the inclined gap G1 and also with the rail gap G3 in the front-rear direction. At this position, when the bolts 10 hanging down flow continuously through the holding rails 31, one bolt 10j in the suspended posture enters the inclined gap G1. Immediately after the bolt 10*j* enters the inclined gap G1, the blade 33 moves in the direction across the bolt guides 5*b*1 (left shift).

Immediately before the subsequent bolt 10*k* that is located behind the bolt 10*j* having entered the inclined gap G1 in the moving direction of the bolts enters the inclined gap G1, the closure portion of the blade 33 closes the downstream side of the holding rails 31 in this left shift, so that the bolt 10*k* is blocked by the closure portion. This blocked bolt 10*k* remains in the holding rails 31. Further, when the blade 33 moves to the left and the inclined gap G1 is aligned with the through hole of the chute 45, the bolt 10*j* in the inclined gap G1 enters the through hole while taking the suspended posture. The bolt 10*j* is then conveyed to the subsequent process.

Accordingly, the bolts 10 having flowed continuously through the holding rails 31 can be released one-by-one without clogging in the through hole for conveying the bolts 10 to the subsequent process. Further, immediately before the subsequent bolt 10*k* that is located behind the bolt 10*j* having entered the inclined gap G1 enter the inclined gap G1, the bolt 10*k* is blocked by the closure portion of the blade 33 moving across the bolts 10. Therefore, because the bolts 10 are not subjected to vibration that would be caused in the conventional device during the release of the bolts, the bolts waiting in the holding rails 31 before being separated and fed can be released so as not to be lifted upward in the opposite direction of the moving direction of the bolts 10. Accordingly, wear of peripheral parts and risk of bolt jamming can be prevented.

(2) The rail gap G3 and the inclined gap (the gap of the bolt passageway) G1 have the gap width, through which only the threaded portion 10*b* of the bolt 10 can pass.

According to this configuration, each of the rail gap G3, the guide gap G2, and the inclined gap G1 has a gap width, through which only the threaded portion 10*b* of the bolt 10 can pass, so that the threaded portion 10*b* of the bolt 10 can move smoothly. This allows the bolts 10 to move smoothly from the holding rails 31 to the chute hole 45*a*.

(3) The recess-shaped guide grooves 3*a*2, 3*b*2 are formed on the side surface of the blade 33 body that is closer to the holding rails 31, the guide grooves 3*a*2, 3*b*2 extending from one end portion to another end portion in the moving direction of the blade 33 through the inclined gap G1, and the holding rails 31 have a plurality of projections 1*a*1, 1*b*1 inserted into the guide grooves 3*a*2, 2*b*2.

According to this configuration, since the projections 1*a*1, 1*b*1 of the holding rails 31 are inserted into the guide grooves 3*a*2, 3*b*2 of the blade 33 that are formed in the moving direction of the blade 33, the blade 33 can be moved stably without wobbling of the axis of movement when the blade 33 moves in a direction orthogonal to the holding rails 31.

(4) The side surface (the longitudinal side surface 3*a*3) of the blade 33 that is closer to the holding rails 31 defines a wall surface extending in the same direction as the hanging direction of the bolts 10 hanging down in the holding rails 31.

According to this configuration, among rising wall surfaces of the blade 33, the longitudinal side surface 3*a*3 defines a wall surface extending in the same direction as the hanging direction of the bolts 10 hanging down in the holding rails 31. Therefore, when the blade 33 moves in a direction orthogonal to the holding rails 31, the longitudinal side surface 3*a*3 (the closure portion) can retain the bolts 10 in the holding rails 31 while intercepting the bolts 10 in the same direction. Since the longitudinal side surface 3*a*3 and the bolts 10 are parallel to each other, the bolts 10 will not be trapped even when the longitudinal side surface 3*a*3 moves.

(5) When the blade 33 moves further, passing through the second position, the blade 33 closes the guide gap G2 formed between the bolt guides 5*b*1, 5*b*1 to expose only the through hole.

According to this configuration, when the bolt 10 enters the through hole, the guide gap G2 is closed, so that only the through hole containing the bolt 10 is exposed. This can prevent bolt 10 from being caught and clogged in the guide gap G2 that is located in front of the through hole for conveying the bolts 10 to the subsequent process.

(6) The bolt escapement device 30 further includes the proximity sensor 42 to detect a bolt 10 having stayed at the holding rails 31 for a predetermined period of time or longer. Supply of bolts 10 to the holding rails 31 is stopped when the proximity sensor 42 detects a bolt 10, and the supply of bolts 10 is started when the detection is released.

This configuration can prevent a larger supply of bolts 10 to the holding rails 31 than is necessary, so that a malfunction such as jamming of bolts 10 can be eliminated.

Other specific configurations can be changed or modified, where appropriate, without departing from the gist of the present invention.

REFERENCE SIGNS LIST 10 bolt
10*a* head portion
10*b* threaded portion
12 rotating plate
13 sorting block
13*a* gap
14 chute rails
14*a*, 14*b* rails
20 bolt feeding apparatus
22*a* control unit
23 bolt feeding unit
26 motor
30 bolt escapement device
31 holding rails
31*a*, 31*b* rail
32 bolt escapement unit
33 blade
33*a* first blade (blade body)
33*b* second blade (blade body)
3*a*2, 3*b*2 guide groove
3*a*3 longitudinal side surface (closure portion) of blade
34 cylinder
34*a* piston rod
35 joint member
33*c* blade base
37 chute base
38 bracket
39 separator base
40 plate
41 bracket
42 proximity sensor
45 chute
45*a* chute hole (through hole)
45*d* opening
5*b*1 bolt guide
46 tube joint
46*a* air tube hole (through hole)
G1 inclined gap (bolt passageway)
G2 guide gap
G3 rail gap

The invention claimed is:

1. A bolt escapement device comprising:
holding rails configured to hold a plurality of bolts hanging down in a rail gap while conveying them downstream;
a blade disposed downstream of the holding rails and configured to release the bolts one-by-one from the holding rails; and
a chute disposed downstream of the blade and having a through hole, through which a bolt having been released is dropped down; wherein
the blade comprises:
 a blade body configured to reciprocate in a direction intersecting the holding rails to pass through a first position and a second position;
 a bolt passageway extending in the blade body in a direction acute to a moving direction of the blade body and allowing a bolt having been released to pass therethrough; and
 a closure portion provided on a side surface of the blade body that is closer to the holding rails and configured to close the rail gap,
an upstream side of the bolt passageway communicates with the rail gap when the blade body is in the first position, and a downstream side of the bolt passageway communicates with the through hole when the blade body is in the second position,
at least one of the holding rails and the chute is provided with bolt guides, the bolt guides intersecting the bolt passageway and configured to guide the bolts from an outlet of the rail gap to the through hole,
when the blade body moves from the first position to the second position, a corner portion of the bolt passageway that is closer to the holding rails is inserted between a bolt having entered the bolt passageway and a subsequent bolt and the rail gap is closed by the closure portion,
the chute has a groove formed to open toward the blade as a part of the through hole, and
when the blade moves further, passing through the second position, a guide gap formed between the bolt guides and an entire opening of the groove are closed so that only the through hole is exposed in an upper-lower direction.

2. The bolt escapement device according to claim 1, wherein the rail gap and a gap of the bolt passageway have a gap width, through which only a threaded portion of a bolt can pass.

3. The bolt escapement device according to claim 1, wherein
the side surface of the blade body that is closer to the holding rails defines a wall surface extending in the same direction as a hanging direction of the bolts hanging down in the holding rails.

4. The bolt escapement device according to claim 1, further comprising a proximity sensor to detect a bolt having stayed at the holding rails for a predetermined period of time or longer, wherein
supply of bolts to the holding rails is stopped when the proximity sensor detects a bolt, and the supply of bolts is started when the detection is released.

5. A bolt escapement device comprising:
holding rails configured to hold a plurality of bolts hanging down in a rail gap while conveying them downstream;
a blade disposed downstream of the holding rails and configured to release the bolts one-by-one from the holding rails; and
a chute disposed downstream of the blade and having a through hole, through which a bolt having been released is dropped down; wherein
the blade comprises:
 a blade body configured to reciprocate in a direction intersecting the holding rails to pass through a first position and a second position;
 a bolt passageway extending in the blade body in a direction acute to a moving direction of the blade body and allowing a bolt having been released to pass therethrough; and
 a closure portion provided on a side surface of the blade body that is closer to the holding rails and configured to close the rail gap,
an upstream side of the bolt passageway communicates with the rail gap when the blade body is in the first position, and a downstream side of the bolt passageway communicates with the through hole when the blade body is in the second position,
at least one of the holding rails and the chute is provided with bolt guides, the bolt guides intersecting the bolt passageway and configured to guide the bolts from an outlet of the rail gap to the through hole,
when the blade body moves from the first position to the second position, a corner portion of the bolt passageway that is closer to the holding rails is inserted between a bolt having entered the bolt passageway and a subsequent bolt and the rail gap is closed by the closure portion,
a recess-shaped guide groove is formed on the side surface of the blade body that is closer to the holding rails, the guide groove extending from one end portion to another end portion in the moving direction of the blade body through the bolt passageway, and
the holding rails have a plurality of projections inserted into the guide groove.

* * * * *